United States Patent
Smith, Jr. et al.

(10) Patent No.: US 7,489,119 B2
(45) Date of Patent: Feb. 10, 2009

(54) DC TO DC CONVERTER WITH REFERENCE VOLTAGE LOOP DISTURBANCE COMPENSATION

(75) Inventors: Mark Smith, Jr., Irvine, CA (US); Chongming Qiao, Irvine, CA (US); Reza Amirani, Dana Point, CA (US)

(73) Assignee: Nexem, Inc., Irvine, CA (US)

( * ) Notice: Subject to any disclaimer, the term of this patent is extended or adjusted under 35 U.S.C. 154(b) by 105 days.

(21) Appl. No.: 11/205,499

(22) Filed: Aug. 17, 2005

(65) Prior Publication Data

US 2007/0040536 A1    Feb. 22, 2007

(51) Int. Cl.
*G05F 1/00*    (2006.01)
(52) U.S. Cl. ................................. 323/283; 323/288
(58) Field of Classification Search .................. 323/282, 323/283, 284, 288, 222; 363/95, 97, 41
See application file for complete search history.

(56) References Cited

U.S. PATENT DOCUMENTS

| | | | |
|---|---|---|---|
| 2004/0135567 A1* | 7/2004 | Fukui | 323/288 |
| 2005/0088155 A1* | 4/2005 | Osburn et al. | 323/282 |
| 2005/0218874 A1* | 10/2005 | Gibson et al. | 323/282 |

* cited by examiner

*Primary Examiner*—Shawn Riley
(74) *Attorney, Agent, or Firm*—Grossman, Tucker, Perreault & Pfleger PLLC (57) ABSTRACT

A controller for a DC to DC converter with reference voltage loop disturbance compensation. The controller may include an error amplifier configured to receive a first signal representative of an actual output voltage of the DC to DC converter and a reference signal representative of a desired output voltage of the DC to DC converter and to provide an error signal representative of a difference between the first signal and the reference signal. The controller may also include a PWM modulator with reference voltage compensation circuitry configured to receive the error signal and compensate for a change in the reference signal in order to control overshoot and undershoot of the actual output voltage from a desired voltage due to the change of the reference signal. An electronic device and method are also provided.

21 Claims, 12 Drawing Sheets

DC TO DC CONVERTER WITH REFERENCE VOLTAGE LOOP DISTURBANCE COMPENSATION

FIELD

This disclosure relates to DC to DC converters and more particularly to a DC to DC converter with reference voltage loop disturbance compensation.

BACKGROUND

A DC to DC converter converts an input DC voltage to an output DC voltage for one or more particular loads. The DC to DC converter may have differing characteristics depending on many factors including the type of load. Many loads require a fixed output DC voltage level. However, other loads, e.g., a processor of a personal computer, may require differing output voltage levels in response to various conditions. To serve such loads, some DC to DC converters require precise startup voltage ramp rates, settling times, and perform "on-the-fly" output voltage changes. For instance, the DC to DC converter may provide a first DC output voltage to the processor during one time interval and then may provide a second DC output voltage to the processor during another time interval.

In order to effect such a change in output voltage of the DC to DC converter, a reference signal, Vp, provided to an error amplifier in a feedback path of a controller for the DC to DC converter may be changed. The error amplifier may compare the reference signal to a voltage level representative of the actual output voltage level, Vout, of the DC to DC converter in order to regulate a conductive state of at least one switch of the DC to DC converter to maintain the output voltage at a desired level despite changes in load condition.

However, in a conventional arrangement as the reference signal is changed, an excessive overshoot and undershoot of the output voltage from the desired output voltage may occur. For example, in one simulation for where the reference signal changed from 0.8 to 1.2 volts, an excessive overshoot of 74 millivolts occurred before the actual output voltage leveled off to the desired 1.2 volts.

Accordingly, there is a need to compensate for such changes in the reference voltage level to lessen the excessive overshoot and undershoot of the actual output voltage from the desired output voltage.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
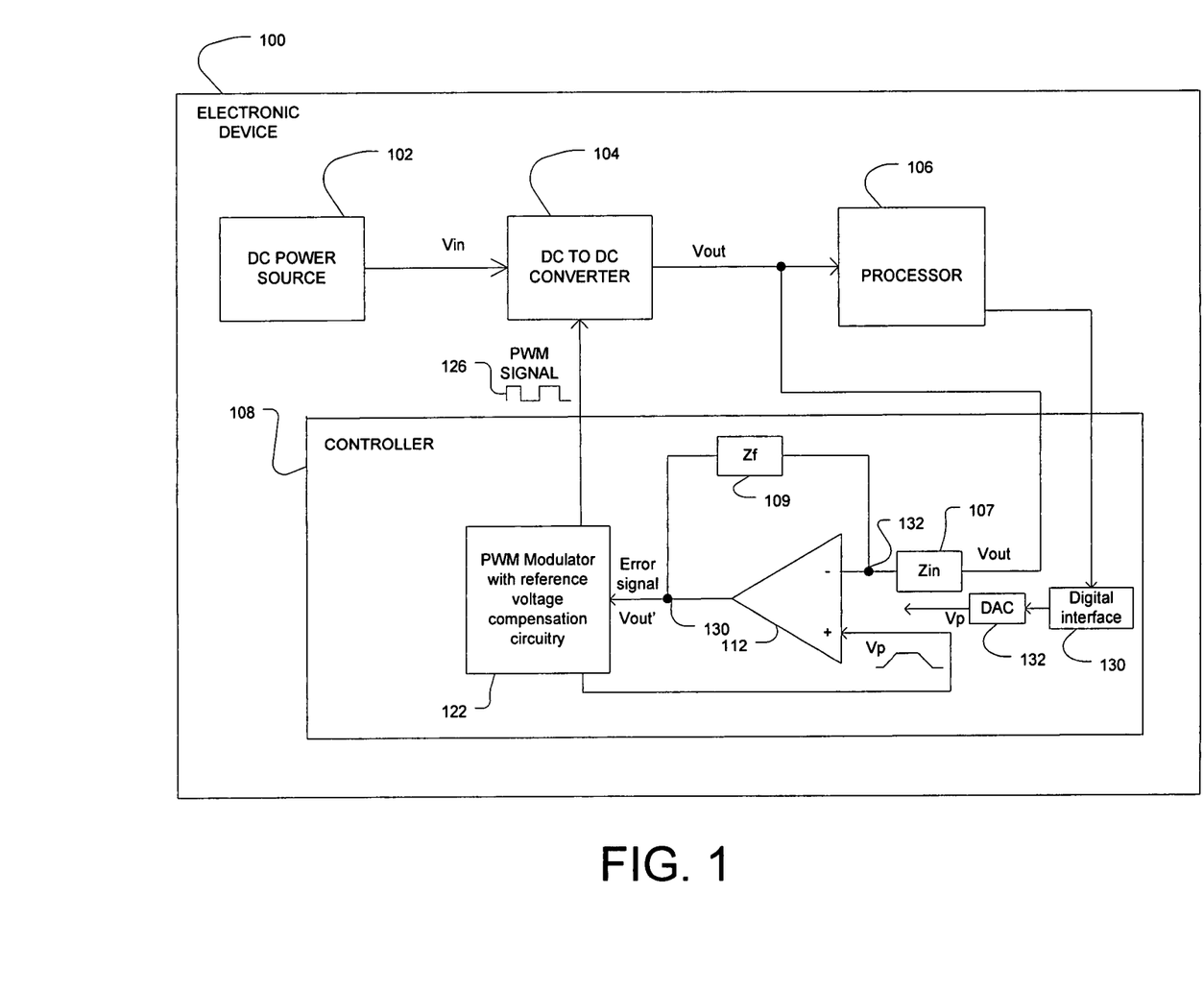
FIG. 1 is a diagram of an electronic device having a controller of a DC to DC converter where the controller includes a pulse width modulation (PWM) modulator with reference voltage compensation circuitry.

FIG. 1 illustrates an electronic device 100 having a DC to DC converter 104 and a controller 108 to control the state of at least one switch of the DC to DC converter 104. The electronic device 100 may also include a processor 106 and a DC power source 102. The electronic device 100 may include, but not be limited to, a personal computer, a laptop computer, a portable phone, a personal digital assistant, etc. The processor 106 may be any variety of processor know in the art such as an Intel®Pentium®IV processor commercially available from Intel Corporation. The DC power source 102 may be any variety of power source known in the art such as an ACDC adapter. Although shown internal to the electronic device 100, the DC power source 102 may also be external to the electronic device 100.

The DC to DC converter 104 may accept a DC input voltage (Vin) from the DC power source 102 and provide an output DC voltage (Vout) to the processor 106. The DC to DC converter 104 may be a variety of switching converters having one or more switches responsive to a control signal from the controller 108. In one embodiment, the DC to DC converter 104 may be a synchronous buck converter having a high side switch, a low side switch, and an LC filter as is known in the art. The control signal provided by the controller 108 may be a pulse width modulated (PWM) signal 126. One or more switches of the DC to DC converter 104 may be responsive to the duty cycle of the PWM signal 126.

The controller 108 may include an error amplifier 112, feedback impedance (Zf) 109, input impedance (Zin) 107, and a PWM modulator with reference voltage compensation circuitry 122. As used in any embodiment herein, "circuitry" or "circuit" may comprise, for example, singly or in any combination, hardwired circuitry, programmable circuitry, state machine circuitry, and/or firmware that stores instructions executed by programmable circuitry. The feedback impedance (Zf) 109 may be coupled to nodes 130 and 132 between the inverting input terminal of the error amplifier 112 and the output terminal of the error amplifier 112. The input impedance (Zin) 107 may be coupled to the inverting input terminal of the error amplifier 112. The error amplifier 112 may accept a first signal representative of the actual output voltage (Vout) of the DC to DC converter 104 at its inverting input terminal, and may accept a reference signal (Vp) representative of a desired output voltage level of the DC to DC converter at its noninverting input terminal. The error amplifier 112 may then output an error signal representative of the difference between the first signal and the reference signal.

The PWM modulator with reference voltage compensation circuitry 122 may be configured to accept the error signal from the error amplifier 112 and to compensate for a change in the reference signal Vp in order to control overshoot and undershoot of the actual output voltage of the DC to DC converter from a desired voltage due to the change in the reference signal Vp. The reference signal Vp may be provided by different sources to the error amplifier 112. In one instance, the reference signal Vp may be provided by a reference source of the PWM modulator with reference voltage compensation circuitry 122. In another instance, the processor 106 may instruct a particular reference signal Vp to be provided via a digital interface 130 and digital to analog converter (DAC) 132. The reference signal Vp may change in response to various operating states of the processor 106. For example, a sleep state of the processor 106 may require an actual output voltage level from the DC to DC converter 104 les than when the processor is not in the sleep state.

Figure 2:
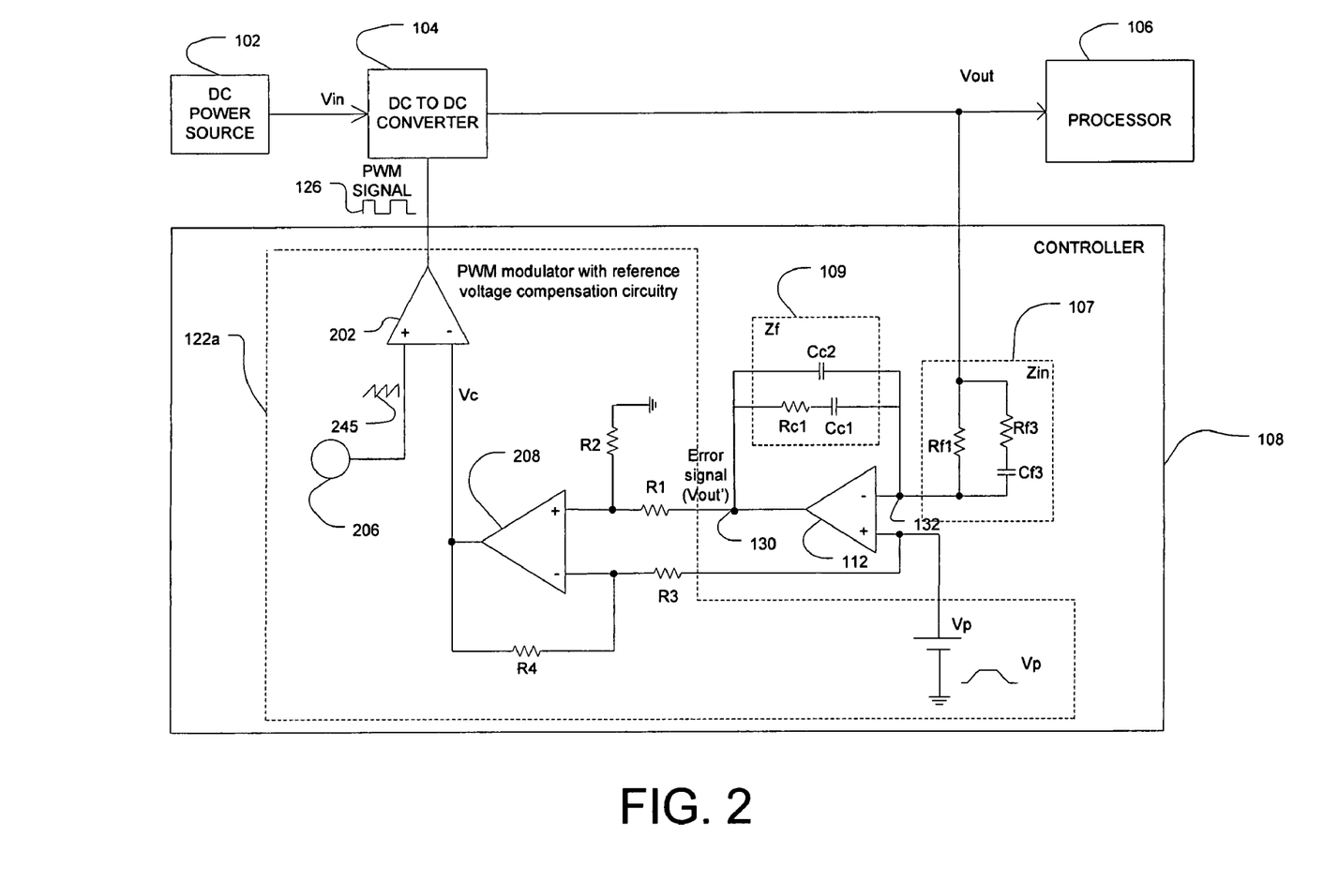
FIG. 2 is a diagram of a first embodiment of the PWM modulator with reference voltage compensation circuitry of FIG. 1.

FIG. 2 illustrates a first embodiment 122a of the PWM modulator with reference voltage compensation circuitry 122 of FIG. 1. The PWM modulator with reference voltage compensation circuitry 122a may include a comparator 202, a signal generator 206, a differential amplifier 208, and resistors R1, R2, R3, and R4. The ratio of resistors R2/R1 and R4/R3 may be equal. When these ratios are not equal, they may provide additional gain/attenuation to the loop. The differential amplifier 208 may be as fast as the error amplifier 112 but does not need as accurate an offset voltage as the error amplifier 112. The differential amplifier 208 may be an operational amplifier. The feedback impedance 109 may include a resistor Rc1 and a capacitor Cc1 coupled in series and another capacitor Cc2 coupled in parallel to the series combination. The input impedance 107 may include another resistor Rf3 coupled in series with a capacitor Cf3 and another resistor Rf1 coupled in parallel to the series combination.

The differential amplifier 208 with the resistors R1, R2, R3, and R4 compensates the error signal (Vout') from the error amplifier 112 to provide the compensated voltage signal (Vc) to the comparator 202. Absent the differential amplifier 208 with resistors R1, R2, R3, and R4, Vout' would be give by equation (1):

$$Vout' = Zf/Zin(Vp-Vout) + Vp; \quad (1)$$

where Vout' is the error signal provided by the error amplifier 112, Zf is the feedback impedance 109, Zin is the input impedance 107, Vp is the reference signal representative of the desired output voltage, and Vout is the actual output voltage.

As can be seen from equation (1), when the reference signal Vp is adjusted, the disturbance in the actual output voltage Vout caused by the italicized Vp term in equation (1) may only be filtered by the DC-DC converter 104 The DC-DC converter 104 may, in theory, mitigate the disturbance. However, the DC-DC Converter 104 is usually designed as a wide bandwidth low pass filter to maximize the DC to DC converter's transient response and hence may not adequately mitigate the disturbance.

The differential amplifier 208 in addition to a stationary signal (in this case ground), may be configured to receive a second signal representative of the error signal (Vout') from the error amplifier 112 and a third signal representative the reference signal Vp and provide a compensated voltage signal Vc in response to a difference between the second signal and third signal. The compensated voltage signal Vc provided by the differential amplifier 208 is given by equation (2).

$$Vc = Zf/Zin(Vp-Vout) \quad (2)$$

Comparing equation (1) to equation (2), it may be seen the differential amplifier 208 with resistors R1, R2, R3, and R4 effectively cancelled out the italicized Vp term of equation (1). Hence, the disturbance to the output voltage Vout due to changes in the reference signal Vp are considerably reduced by the differential amplifier 208, e.g., the overshoot and undershoot of the actual output voltage from a desired output voltage.

The comparator 202 may receive the compensated voltage signal Vc from the differential amplifier 208 and may also receive a periodic signal at a particular frequency from the signal generator 206. In one instance, the signal generator 206 may be an oscillator and the periodic signal may be the ramp signal 245. The intersection of the compensated voltage signal (Vc) with the ramp signal 245 may set the duty cycle of the PWM signal 126. The greater the error between the actual and desired output voltage, the greater the compensated voltage signal (Vc) and hence the greater the duty cycle of the PWM signal 126.

Figure 3:
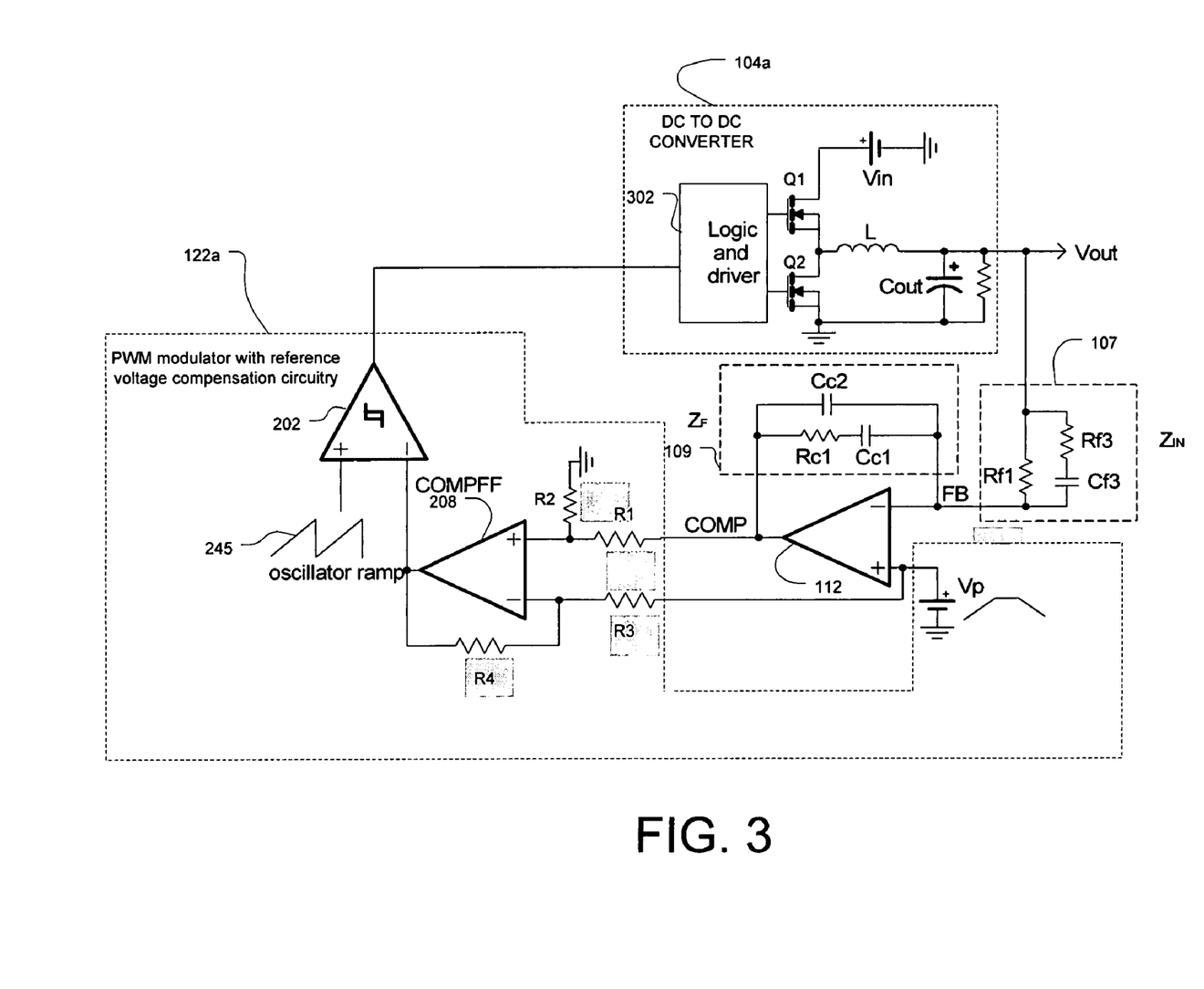
FIG. 3 is another diagram of the first embodiment of the PWM modulator with reference voltage compensation circuitry of FIG. 1.

FIG. 3 is another diagram of the first embodiment of the PWM modulator with reference voltage compensation circuitry 122a consistent with FIG. 2. Similar parts are labeled similarly and hence any repetitive description is omitted herein for clarity. Compared to FIG. 2, more details of an embodiment 104a of a DC to DC converter are illustrated. The DC to DC converter 104a may include logic and driver 302, a high side switch such as transistor Q1, a low side switch such as transistor Q2, and inductor L and output capacitor Cout.

The first embodiment reduces overshoot of the actual output voltage compared to a desired voltage by subtracting out the second Vp term shown in italics in equation (1) thus effectively achieving a feed forward of Vp. The estimated overshoot for the first embodiment is given by equation (3):

$$\Delta V_{OVERSHOOT\_FF} \approx R_{C1} \times C_{C1} \times \left(-\frac{V_{OSC\_PK}}{V_{IN}}\right) \times \frac{dV_P}{dt}; \quad (3)$$

where $R_{C1}$ is a value of the resistor $R_{C1}$ of the feedback impedance 109, $C_{C1}$ is the value of the capacitor $C_{C1}$ of the feedback impedance 109, $V_{OSC\_PK}$ is a peak to peak voltage of the ramp signal 245, Vin is an input voltage of the DC to DC converter 104, and $dV_p/dt$ is a slew rate of the change in the reference signal Vp.

Figure 4:
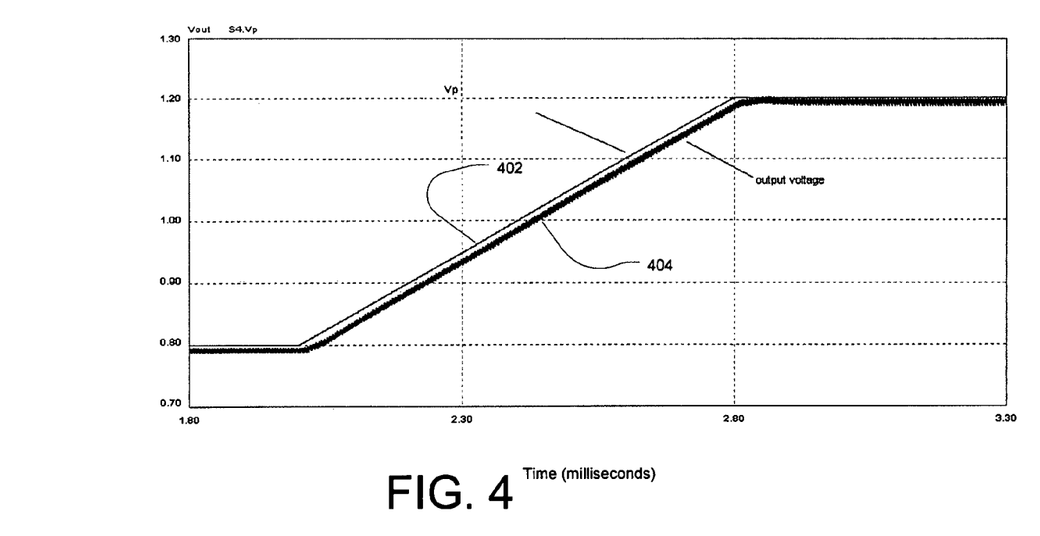
FIG. 4 is a graph of plots illustrating a simulation of the embodiment of FIG. 3 where overshoot of the output voltage is controlled as Vp changes.

FIG. 4 is a graph of plots illustrating a simulation of the embodiment of FIG. 3 where the overshoot of the output voltage is controlled as Vp changes. Plot 402 is a plot of Vp representative of the desired output voltage and plot 404 is a plot of the actual output voltage. As Vp changed from 0.8 volts to 1.2 volts, there is no overshoot of the output voltage. In fact, the overshoot is eliminated and a small undershoot determined by $-V_{OSC\_PK}$/Vin as detailed in equation (3) is actually present. During a transient, this small undershoot is desirable since it relaxes the phase margin requirement of the system loop gain.

Figure 5:
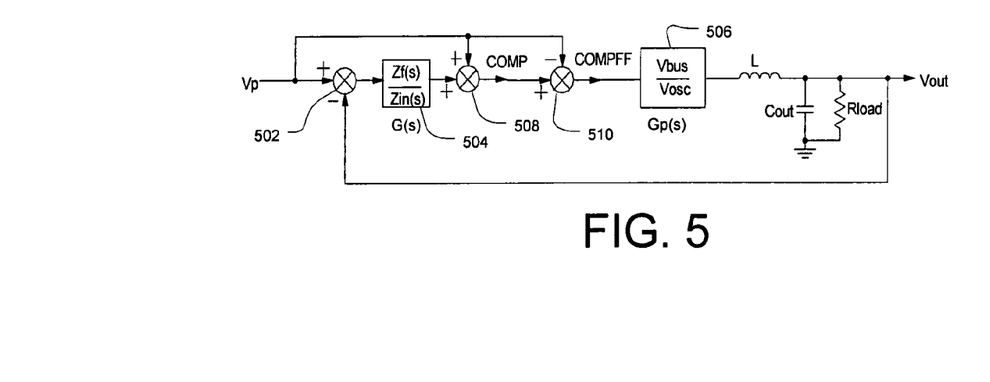
FIG. 5 is a block diagram illustrating the feed forward of the reference signal for the first embodiment of the PWM modulator with reference voltage compensation circuitry.

FIG. 5 illustrates the disturbance path for Vp of the first embodiment. A summation node 502 accepts the Vp and Vout signal and the disturbance to the output voltage Vout caused by a change to Vp may be filtered by both the G(s) plant 504 and the Gp(s) plant 506. The summation nodes 508 and 510 effectively cancel the second Vp term shown in italics in equation (1). The G(s) plant 504 may be equal to Zf/Zin and the Gp(s) plant 506 may be the frequency response provided by the PWM modulator. The system transfer function for the system of FIG. 5 is given by equation (4).

$$Vout/Vp = G(s)Gp(s)/1+G(s)Gp(s) \quad (4)$$

As illustrated by the system transfer function of equation (4), the change in Vp may be filtered by both the G(s) plant 504 and the Gp(s) plant 506 before affecting the output voltage Vout. The system performance may be ensured by selecting $G(s)Gp(s) \gg 1$ and following traditional loop compensation techniques.

Figure 6:
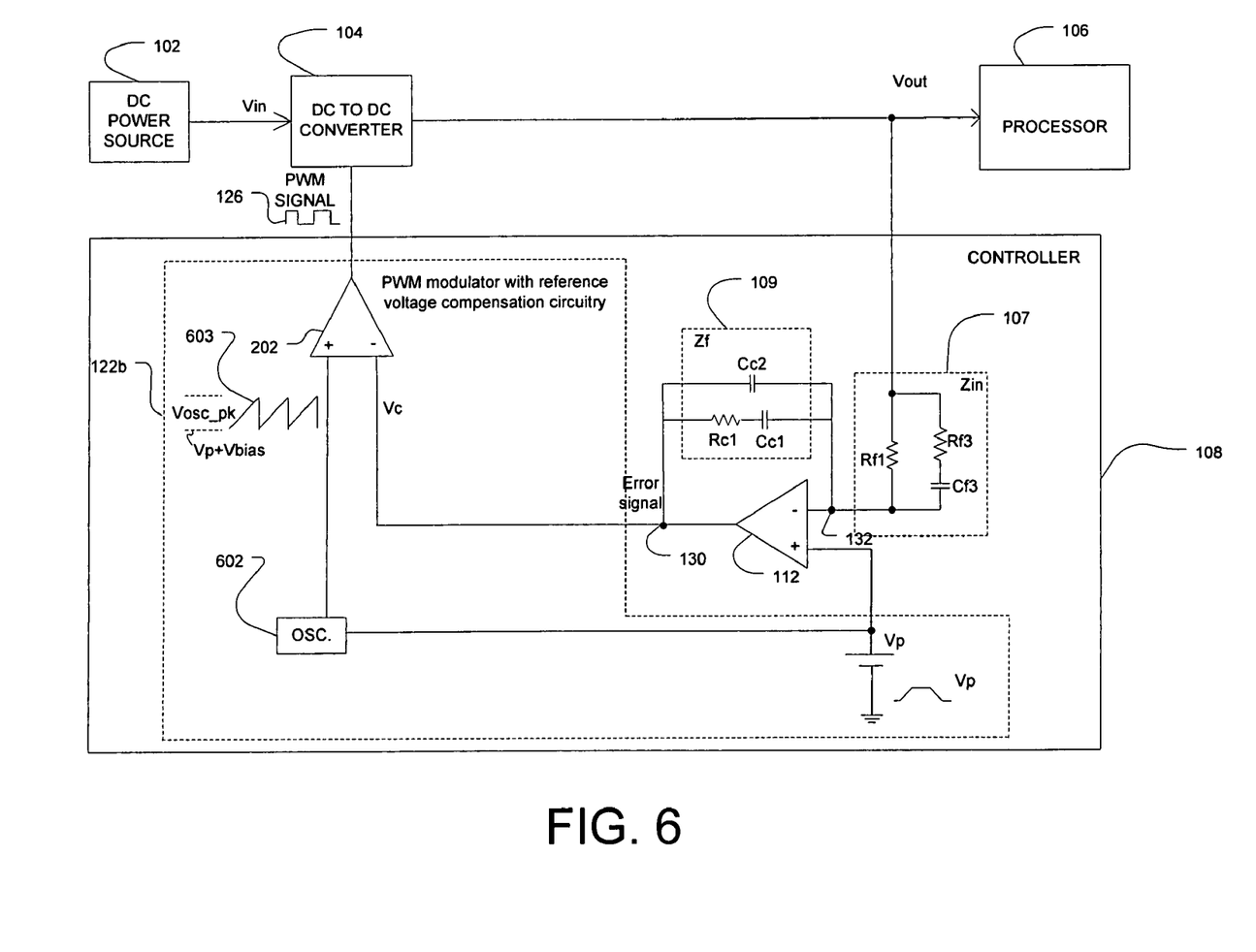
FIG. 6 is a diagram of a second embodiment of the PWM modulator with reference voltage compensation circuitry of claim 1.

FIG. 6 is a diagram of a second embodiment 122b of the PWM modulator with reference voltage compensation circuitry 122 of FIG. 1. The PWM modulator with reference voltage compensation circuitry 122b also effectively achieves a feed forward of Vp by canceling out the effects of Vp as detailed in equation (2). Rather than modify the error signal from the error amplifier 112 with the differential amplifier 208 and resistors R1, R2, R3, and R4 as detailed in the first embodiment, the second embodiment modifies the bias voltage of the ramp signal 603 provided by the oscillator 602 in response to a change in the reference signal Vp. The bias voltage of the ramp signal may be adjusted so that the bias voltage follows the reference signal Vp rather than being constant. In other words, the oscillator bias voltage of the second embodiment may be given by equation (5):

$$V_{OSC\_BIAS}(t) = V_p(t) + V_{BIAS}; \quad (5)$$

wherein $V_{OSC\_BIAS}$ is the bias voltage of the ramp signal 603 at time (t), $V_p(t)$ is the voltage of the reference signal Vp at time t, and $V_{BIAS}$ is the original constant DC bias voltage of the ramp signal 603. Since Vp can change with time, the bias voltage of the ramp signal 603 would also change with time coincident with the change in Vp. The peak to peak ramp amplitude of the ramp signal 603 may remain constant despite the change in the bias voltage of the ramp signal.

Figure 7:
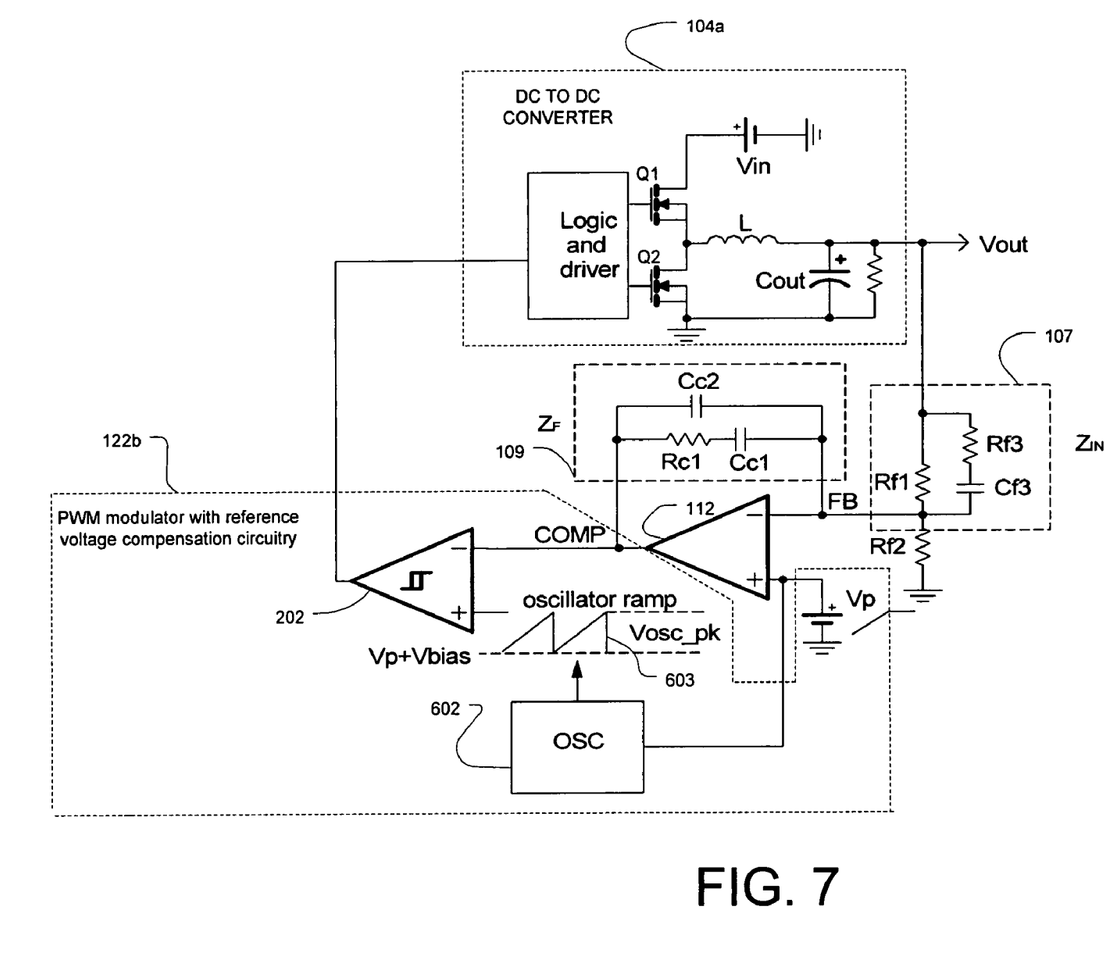
FIG. 7 is another diagram of the second embodiment of the PWM modulator with reference voltage compensation circuitry of FIG. 1.

FIG. 7 is another diagram of the second embodiment of the PWM modulator with reference voltage compensation circuitry 122b consistent with FIG. 6. Similar parts are labeled similarly and hence any repetitive description is omitted herein for clarity. Compared to FIG. 6, more details of an embodiment 104a of a DC to DC converter are illustrated. The DC to DC converter 104a may include logic and driver, a high side switch such as transistor Q1, a low side switch such as transistor Q2, and inductor L and output capacitor Cout.

The second embodiment reduces overshoot of the actual output voltage compared to a desired voltage by subtracting out the second Vp term shown in italics in equation (1) thus effectively achieving a feed forward of Vp. The estimated overshoot for the second embodiment is given by equation (6):

$$\Delta V_{OVERSHOOT\_FF} \approx R_{C1} \times C_{C1} \times \left(-\frac{V_{OSC\_PK}}{V_{IN}}\right) \times \frac{dV_P}{dt}; \quad (6)$$

where $R_{C1}$ is a value of the resistor $R_{C1}$ of the feedback impedance 109, $C_{C1}$ is the value of the capacitor $C_{C1}$ of the feedback impedance 109, $V_{OSC\_PK}$ is a peak to peak voltage of the ramp signal 603, Vin is an input voltage of the DC to DC converter 104, and $dV_p/dt$ is a slew rate of the change in the reference signal Vp. As can be seen, equation (6) is the same as equation (3).

Figure 8:
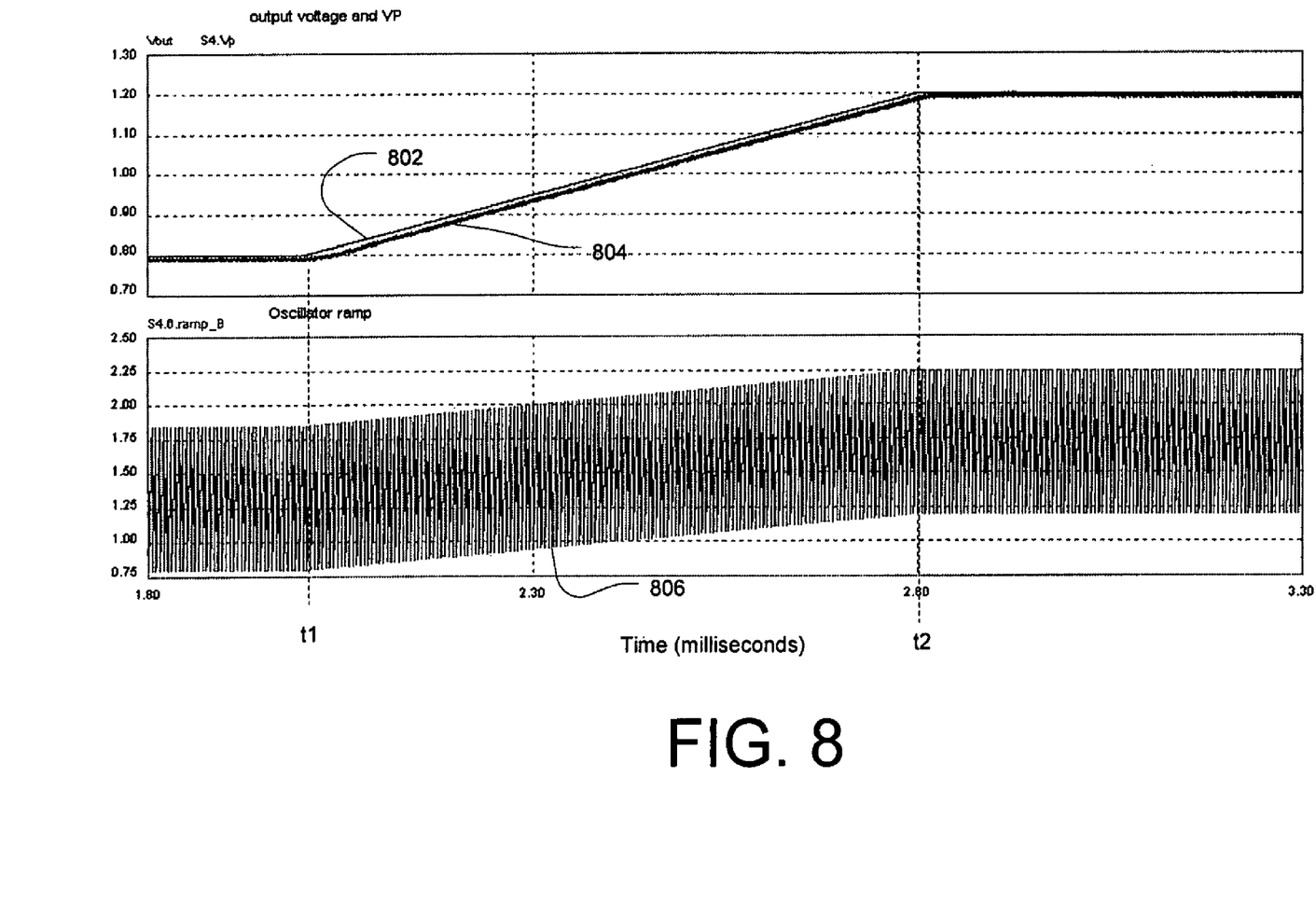
FIG. 8 is a graph of plots illustrating a simulation of the second embodiment of FIG. 7 where overshoot of the output voltage is controlled as Vp changes.

FIG. 8 is a graph of plots illustrating a simulation of the embodiment of FIG. 7 where the overshoot of the output voltage is controlled as Vp changes. Plot 802 is a plot of Vp representative of the desired output voltage and plot 804 is a plot of the actual output voltage. Plot 806 is a plot of the ramp signal 603 input to the comparator 202 over a similar time interval. Plot 806 illustrates that as Vp changes between times t1 and t2 the bias voltage of the ramp signal 603 changes by a corresponding amount consistent with equation (5). The peak to peak amplitude of the ramp signal also remains constant irrespective of changes in its DC bias voltage.

As Vp changed from 0.8 volts to 1.2 volts between times t1 and t2, there is no overshoot of the output voltage. In fact, the overshoot is eliminated and a small undershoot determined by $-V_{OSC\_PK}$/Vin as detailed in equation (6) is actually present. During a transient, this small undershoot is desirable since it relaxes the phase margin requirement of the system loop gain.

Figure 9:
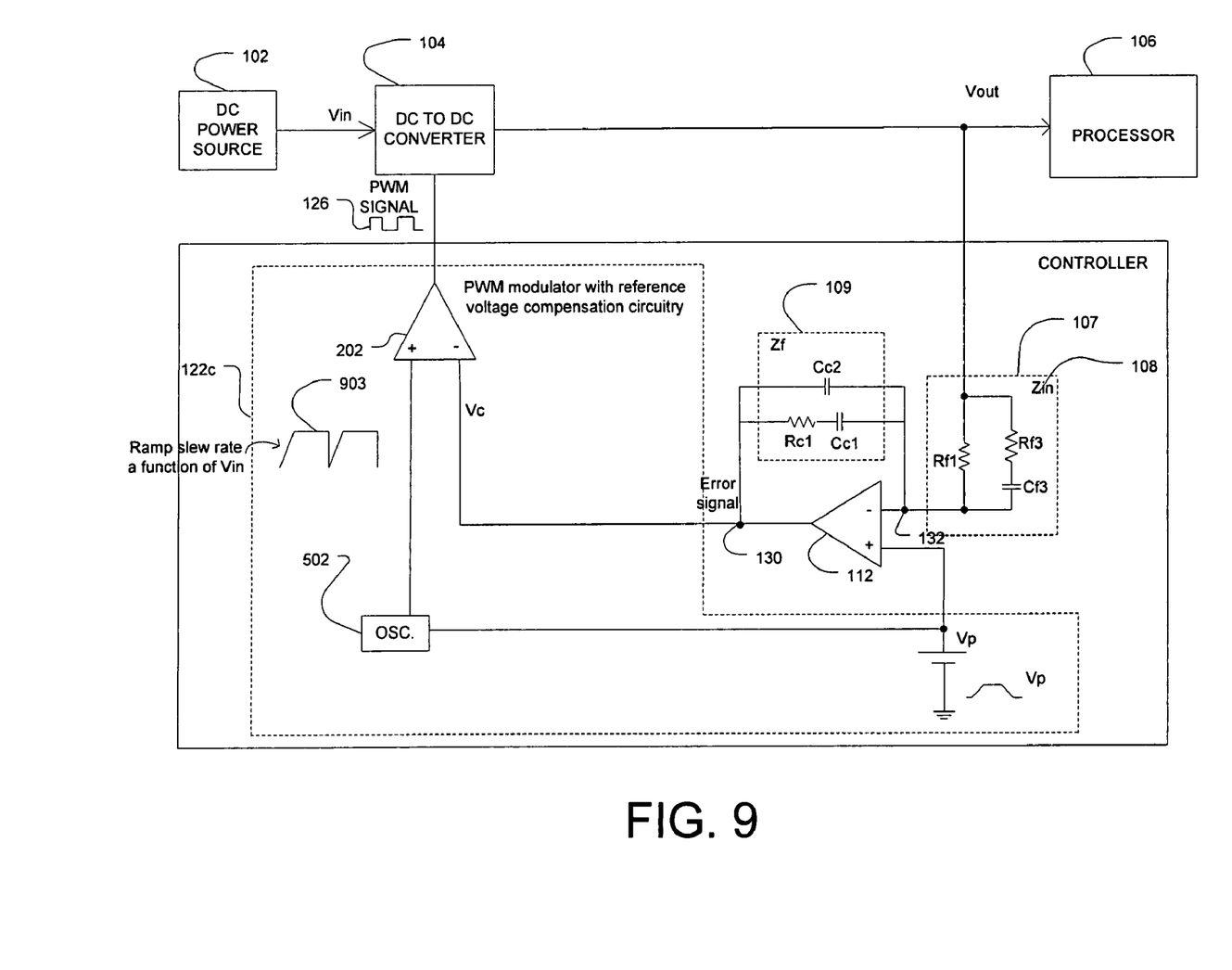
FIG. 9 a diagram of a third embodiment of the PWM modulator with reference voltage compensation circuitry of FIG. 1.

FIG. 9 is a diagram of a third embodiment 122c of the PWM modulator with reference voltage compensation circuitry 122 of FIG. 1. Rather than modify the error signal from the error amplifier 112 with the differential amplifier 208 and resistors R1, R2, R3, and R4 as detailed in the first embodiment, the third embodiment may modify the slew rate of the ramp signal 903 in response to the input voltage of the DC to DC converter. The third embodiment may effectively perform a feed forward of the input voltage Vin to achieve unity gain of Vout to COMP by changing the slew rate of the ramp signal 903.

Overshoot problems may be caused by current flowing from the output to the node 132 during a change of Vp. This current may be caused by the slew rate difference between the error signal or COMP and Vp. In other words, the overshoot may be estimated by equation (7).

$$\Delta V_{OVERSHOOT} \approx R_{f1} \times C_{C1} \times \left(\frac{dV_P}{dt} - \frac{dV_{COMP}(t)}{dt}\right) \quad (7)$$

The third embodiment may adjust or design the modulator gain so that equation (8) is satisfied in order to force the overshoot as detailed in equation (7) to zero.

$$\frac{dV_P}{dt} = \frac{dV_{COMP}(t)}{dt} = \frac{dV_{OUT}}{dt} \quad (8)$$

In equation (8), $dV_p/dt$ is a slew rate of a change is the reference signal Vp, $dVcomp(t)/dt$ is a slew rate of the error signal from the error amplifier 112, and dVout/dt is a slew rate of the output voltage of the DC to DC converter.

For a conventional architecture having no reference voltage compensation, the control gain from the output to COMP may be as detailed in equation (9).

$$\frac{V_{OUT}(s)}{V_{COMP}(s)} = \frac{V_{IN}}{V_{OSC\_PK}} \times f(LCfilter) \quad (9)$$

Figure 10:
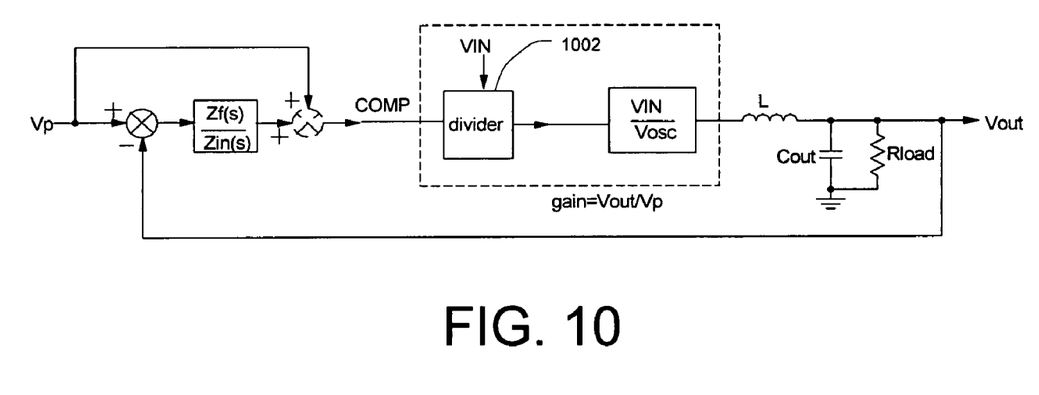
FIG. 10 is a block control diagram of the third embodiment.

As illustrated in FIG. 10, one solution is to utilize a divider 1002 to implement the feed-forward of VIN. The transfer function from the output to the COMP pin can be written as detailed in equation (10).

$$\frac{V_{OUT}(s)}{V_{COMP}(s)} = K \times \frac{V_{IN}}{V_{OSC\_PK}} \times f(LCfilter) \tag{10}$$

Since the DC gain of the LC filter is almost one, K can be selected as detailed in equation (11).

$$K = \frac{V_{OSC\_PK}}{V_{IN}} \tag{11}$$

In this case, the DC gain from output to COMP is one as detailed in equation (12).

$$\frac{V_{OUT}(s)}{V_{COMP}(s)} = f(LCfilter) \tag{12}$$

The slew rate of COMP may be the same as VOUT if the LC effect is neglected resulting in:

$$\frac{dV_{COMP}(t)}{dt} = \frac{dV_{OUT}}{dt} \tag{13}$$

Figure 11:
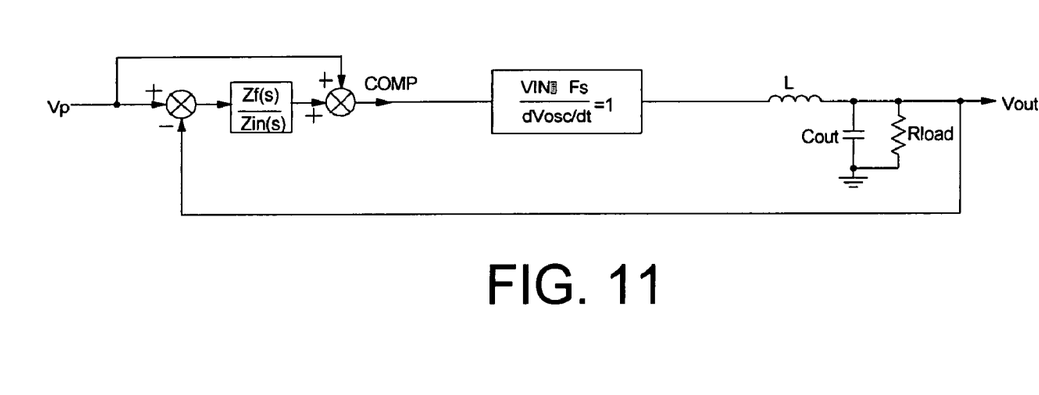
FIG. 11 is another block control diagram of the third embodiment.

Accordingly, the overshoot of the actual output voltage compared to the desired output voltage will be minimized when Vp changes. This implementation is equivalent to changing the system gain such that the signal gain from output to Vp is unity. From FIG. 11, the signal gain from Vp to COMP may be given by equation (14).

$$\frac{V_{COMP}(s)}{V_p(s)} = 1 + \frac{Z_F}{Z_{IN}} \tag{14}$$

The DC gain from COMP to Vp also has a gain of one. In that case, from equation (14) and (12), the gain from output to Vp is given by equation (15).

$$\frac{V_{OUT}(s)}{V_P(s)} = \frac{V_{COMP}(s)}{V_P(s)} \times \frac{V_{OUT}(s)}{V_{COMP}(s)} = \left(1 + \frac{Z_F}{Z_{IN}}\right) \times f(LCfilter) \tag{15}$$

The DC gain is one. When Vp changes, the output voltage will follow Vp without any overshoot. This can be implemented by changing the ramp of the oscillator such that:

$$\frac{V_{IN}}{V_{OSC\_PK}} = 1 \tag{16}$$

In reality, the oscillator peak may not be as high as Vin since the PWM integrated circuit (IC) bias voltage is typically lower than Vin. However, since the peak of the oscillator equals:

$$V_{OSC\_PK} = T_S \times dV_{OSC\_PK}/dt = \frac{dV_{OSC}/dt}{F_S} \tag{17}$$

equation (17) can be modified so that $$\frac{V_{IN}}{dV_{OSC}/dt} \times F_S = 1 \tag{18}$$

Figure 12:
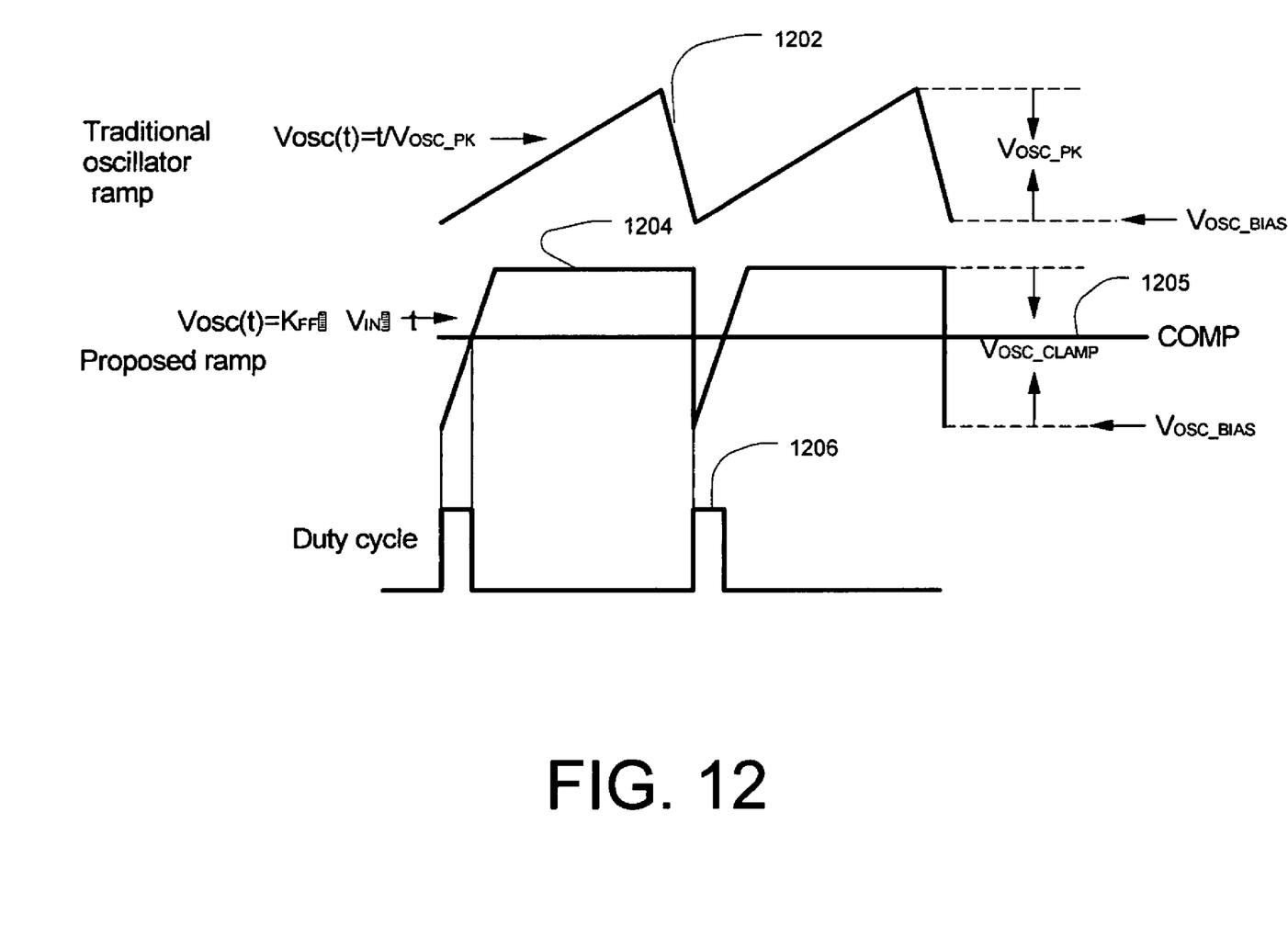
FIG. 12 is a graph of plots illustrating the ramp slew rate of the ramp signal input to the PWM comparator and the resulting duty cycle of the PWM signal for the third embodiment.

A control block diagram of the third embodiment is illustrated in FIG. 11. FIG. 12 illustrates a plot 1202 of a traditional ramp signal compared to a plot 1204 of a ramp signal according to the third embodiment where the slew rate of the ramp signal has been modified as a function of Vin. Plot 1206 is a plot of the resulting PWM signal provided by the PWM comparator to the DC to DC converter having a duty cycle dependent on the intersection of plot 1204 with the COMP signal 1205 from error amplifier 112.

Figure 13:
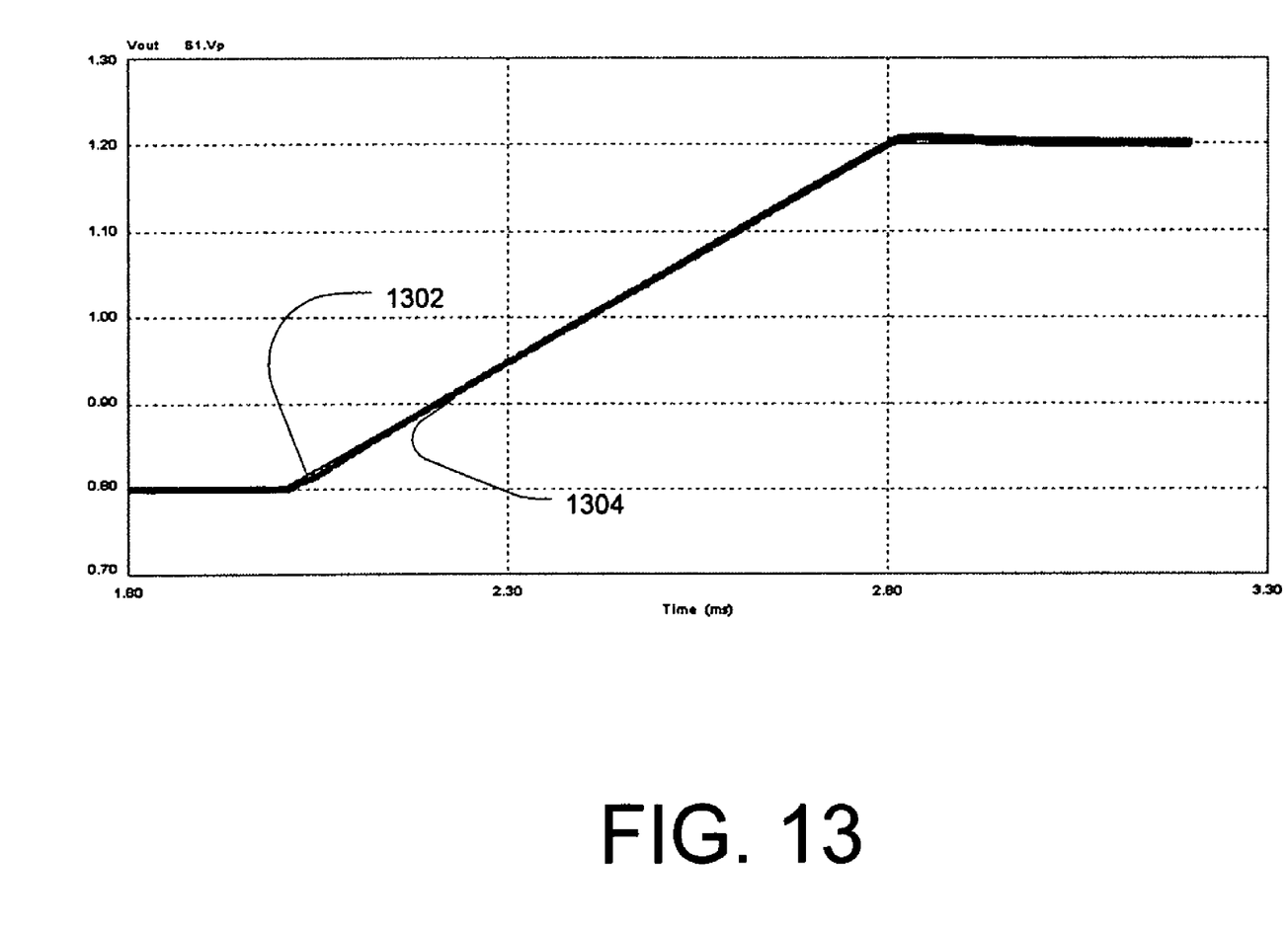
FIG. 13 is a graph of plots illustrating a simulation of the third embodiment where overshoot of the output voltage is controlled as Vp changes.

FIG. 13 illustrates a graph of plots illustrating a simulation result of the third embodiment. As illustrated, overshoot has been all but eliminated. Plot 1302 is plot of Vp representative of the desired output voltage which tracks closely with plot 1304 which is a plot of the actual output voltage during this time period.

Figure 14:
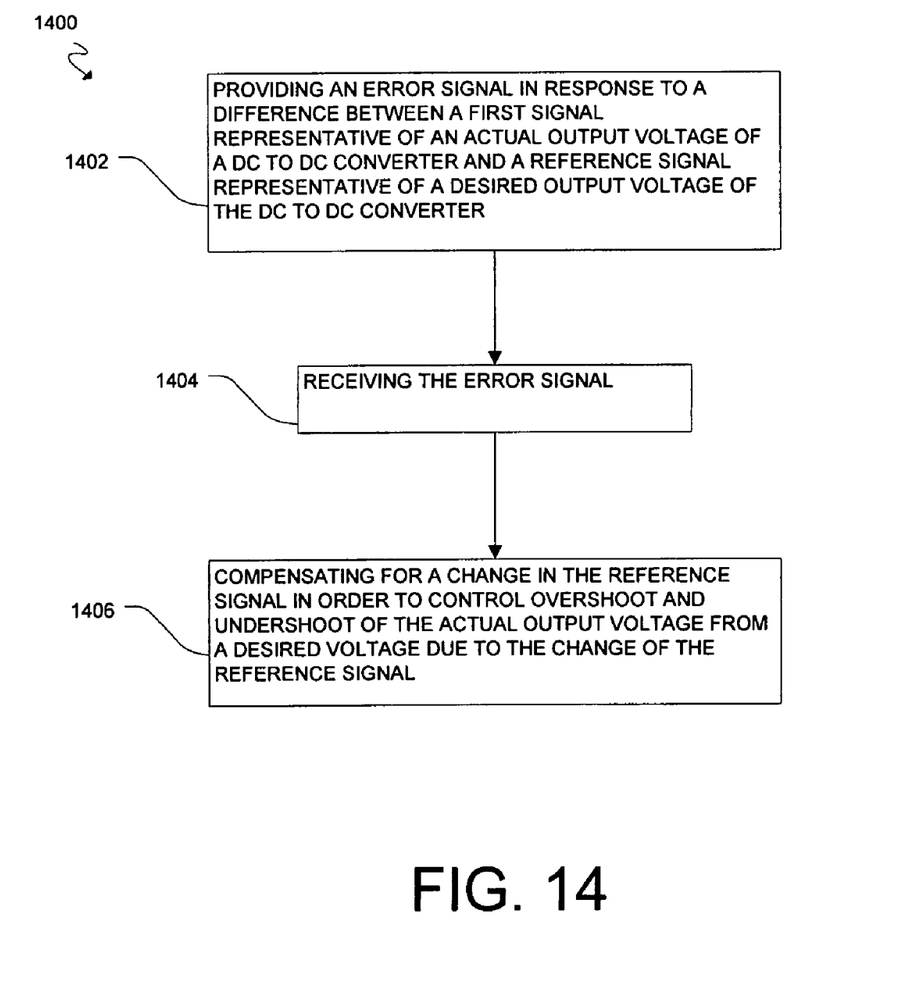
FIG. 14 is a flow chart illustrating operations that may be performed according to an embodiment.

FIG. 14 is a flow chart 1400 of operations consistent with an embodiment. Operation 1402 may include providing an error signal in response to a difference between a first signal representative of an actual output voltage of a DC to DC converter and a reference signal representative of a desired output voltage of the DC to DC converter. Operation 1404 may include receiving the error signal. Finally, operation 1406 may include compensating for a change in the reference signal in order to control overshoot and undershoot of the actual output voltage from a desired voltage due to the change of the reference signal.

In summary, there is thus provided a controller for a DC to DC converter. The controller may include an error amplifier configured to receive a first signal representative of an actual output voltage of the DC to DC converter and a reference signal representative of a desired output voltage of the DC to DC converter and to provide an error signal representative of a difference between the first signal and the reference signal. The controller may also include a PWM modulator with reference voltage compensation circuitry configured to receive the error signal and compensate for a change in the reference signal in order to control overshoot and undershoot of the actual output voltage from a desired voltage due to the change of the reference signal.

There is also provided an electronic device. The electronic device may include a processor, a DC to DC converter to accept an input voltage and provide an output voltage to the processor, and a controller to control the DC to DC converter. The controller may include an error amplifier configured to receive a first signal representative of an actual output voltage of the DC to DC converter and a reference signal representative of a desired output voltage of the DC to DC converter and to provide an error signal representative of a difference between the first signal and the reference signal. The controller may also include a PWM modulator with reference voltage compensation circuitry configured to receive the error signal and compensate for a change in the reference signal in order to control overshoot and undershoot of the actual output voltage from a desired voltage due to the change of the reference signal.

Advantageously, a change in Vp indicating a desired change to the output voltage of the DC to DC converter does not create an excessive disturbance to the output voltage of the DC to DC converter. This can be seen in relatively little overshoot and undershoot as the output voltage changes from one output voltage level to another.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A controller for a DC to DC converter comprising:
   an error amplifier configured to receive a first signal representative of an actual output voltage of said DC to DC converter and a reference signal representative of a desired output voltage of said DC to DC converter and to provide an error signal representative of a difference between said first signal and said reference signal; and
   a pulse width modulation (PWM) modulator with reference voltage compensation circuitry configured to receive said error signal and compensate for a change in said reference signal in order to control overshoot and undershoot of said actual output voltage from a desired voltage due to said change of said reference signal, wherein said PWM modulator with reference voltage compensation circuitry comprises:
     a differential amplifier configured to receive a second signal representative of said error signal and a third signal representative of said reference signal and to provide a compensated voltage signal in response to a difference between said second signal and said third signal; and
     a comparator configured to receive said compensated voltage signal and a periodic signal and to provide a PWM signal to said DC to DC converter in response to a comparison of said compensated voltage signal with said periodic signal.

2. The controller of claim 1, further comprising a feedback impedance coupled between an inverting input terminal of said error amplifier and an output terminal of said error amplifier, and an input impedance coupled to said inverting input terminal of said error amplifier, and wherein said compensated voltage signal is given by the equation:

$Vc = Zf/Zin(Vp - Vout)$;

where Vc is said compensated voltage signal, Zf is said feedback impedance, Zin is said input impedance, Vp is said reference signal, and Vout is said actual output voltage.

3. The controller of claim 2, wherein said feedback impedance comprises a resistor in series with a capacitor, wherein said periodic signal comprises a ramp signal, and wherein said overshoot of said actual output voltage from said desired voltage due to said change of said reference signal is estimated by the equation:

$$\Delta V_{OVERSHOOT\_FF} \approx R_{C1} \times C_{C1} \times \left(-\frac{V_{OSC\_PK}}{V_{IN}}\right) \times \frac{dV_P}{dt};$$

where $R_{C1}$ is a value of said resistor of said feedback impedance, $C_{C1}$ is a value of said capacitor of said feedback impedance, $V_{OSC\_PK}$ is a peak to peak voltage of said ramp signal, Vin is an input voltage of said DC to DC converter, and $dV_P/dt$ is a slew rate of said change in said reference signal.

4. The controller of claim 1, wherein said comparator is configured to receive said compensated voltage signal and a ramp signal provided by an oscillator, said oscillator configured to change a bias voltage of said ramp signal in response to said change in said reference signal.

5. The controller of claim 4, further comprising a feedback impedance comprising a resistor in series with a capacitor, said feedback impedance coupled between an inverting input terminal of said error amplifier and an output terminal of said error amplifier, and wherein said overshoot of said actual output voltage from said desired voltage due to said change of said reference signal is estimated by the equation:

$$\Delta V_{OVERSHOOT\_FF} \approx R_{C1} \times C_{C1} \times \left(-\frac{V_{OSC\_PK}}{V_{IN}}\right) \times \frac{dV_P}{dt};$$

where $R_{C1}$ is a value of said resistor of said feedback impedance, $C_{C1}$ is a value of said capacitor of said feedback impedance, $V_{OSC\_PK}$ is a peak to peak voltage of said ramp signal, Vin is an input voltage of said DC to DC converter, and $dV_P/dt$ is a slew rate of said change in said reference signal.

6. The controller of claim 1, wherein said comparator is configured to receive said compensated voltage signal and a ramp signal provided by an oscillator, said oscillator configured to change a slew rate of said ramp signal in response to an input voltage of said DC to DC converter.

7. The controller of claim 6, wherein a gain of said PWM modulator with reference voltage compensation circuitry is adjusted to drive said overshoot to zero by satisfying the equation:

$$\frac{dV_P}{dt} = \frac{dV_{COMP}(t)}{dt} = \frac{dV_{OUT}}{dt};$$

where $dV_P/dt$ is a slew rate of said change is said reference signal, $dVcomp(t)/dt$ is a slew rate of said error signal from said error amplifier, and $dVout/dt$ is a slew rate of said output voltage of said DC to DC converter.

8. An electronic device comprising:
   a processor;
   a DC to DC converter to accept an input voltage and provide an output voltage to said processor;
   a controller to control said DC to DC converter, said controller comprising:
     an error amplifier configured to receive a first signal representative of an actual output voltage of said DC to DC converter and a reference signal representative of a desired output voltage of said DC to DC converter and to provide an error signal representative of a difference between said first signal and said reference signal; and
     a pulse width modulation (PWM) modulator with reference voltage compensation circuitry configured to receive said error signal and compensate for a change in said reference signal in order to control overshoot and undershoot of said actual output voltage from a desired voltage due to said change of said reference signal, wherein said PWM modulator with reference voltage compensation circuitry comprises:
- a differential amplifier configured to receive a second signal representative of said error signal and a third signal representative of said reference signal and to provide a compensated voltage signal in response to a difference between said second signal and said third signal; and
- a comparator configured to receive said compensated voltage signal and a periodic signal and to provide a PWM signal to said DC to DC convener in response to a comparison of said compensated voltage signal with said periodic signal.

9. The electronic device of claim 8, wherein said PWM modulator with reference voltage compensation circuitry further comprises a feedback impedance coupled between an inverting input terminal of said error amplifier and an output terminal of said error amplifier, and an input impedance coupled to said inverting input terminal of said error amplifier, and wherein said compensated voltage signal is given by the equation:

$$Vc = Zf/Zin(Vp - Vout);$$

where Vc is said compensated voltage signal, Zf is said feedback impedance, Zin is said input impedance, Vp is said reference signal, and Vout is said actual output voltage.

10. The electronic device of claim 9, wherein said feedback impedance comprises a resistor in series with a capacitor, wherein said periodic signal comprises a ramp signal, and wherein said overshoot of said actual output voltage from said desired voltage due to said change of said reference signal is estimated by the equation:

$$\Delta V_{OVERSHOOT\_FF} \approx R_{C1} \times C_{C1} \times \left(-\frac{V_{OSC\_PK}}{V_{IN}}\right) \times \frac{dV_P}{dt};$$

where $R_{C1}$ is a value of said resistor of said feedback impedance, $C_{C1}$ is a value of said capacitor of said feedback impedance, $V_{OSC\_PK}$ is a peak to peak voltage of said ramp signal, Vin is said input voltage of said DC to DC converter, and $Dv_P/dt$ is a slew rate of said change in said reference signal.

11. The electronic device of claim 8, wherein said comparator is configured to receive said compensated voltage signal and a ramp signal provided by an oscillator, said oscillator configured to change a bias voltage of said ramp signal in response to said change in said reference signal.

12. The electronic device of claim 11, wherein said PWM modulator with reference voltage compensation circuitry further comprises a feedback impedance comprising a resistor in series with a capacitor, said feedback impedance coupled between an inverting input terminal of said error amplifier and an output terminal of said error amplifier, and wherein said overshoot of said actual output voltage from said desired voltage due to said change of said reference signal is estimated by the equation:

$$\Delta V_{OVERSHOOT\_FF} \approx R_{C1} \times C_{C1} \times \left(-\frac{V_{OSC\_PK}}{V_{IN}}\right) \times \frac{dV_P}{dt};$$

where $R_{C1}$ is a value of said resistor of said feedback impedance, $C_{C1}$ is a value of said capacitor of said feedback impedance, $V_{OSC\_PK}$ is a peak to peak voltage of said ramp signal, Vin is an input voltage of said DC to DC converter, and $dV_P/dt$ is a slew rate of said change in said reference signal.

13. The electronic device of claim 8, wherein said comparator is configured to receive said compensated voltage signal and a ramp signal provided by an oscillator, said oscillator configured to change a slew rate of said ramp signal in response to an input voltage of said DC to DC converter.

14. The electronic device of claim 13, wherein a gain of said PWM modulator with reference voltage compensation circuitry is adjusted to drive said overshoot to zero by satisfying the equation:

$$\frac{dV_P}{dt} = \frac{dV_{COMP}(t)}{dt} = \frac{dV_{OUT}}{dt};$$

where $dV_P/dt$ is a slew rate of said change is said reference signal, $dVcomp(t)/dt$ is a slew rate of said error signal from said error amplifier, and dVout/dt is a slew rate of said output voltage of said DC to DC converter.

15. A method comprising:
providing an error signal in response to a difference between a first signal representative of an actual output voltage of a DC to DC converter and a reference signal representative of a desired output voltage of said DC to DC converter;
receiving said error signal; and
compensating for a change in said reference signal in order to control overshoot and undershoot of said actual output voltage from a desired voltage due to said change of said reference signal comprising receiving a second signal representative of said error signal and a third signal representative of said reference signal at a differential amplifier to provide a compensated voltage signal in response to a difference between said second signal and said third signal, and receiving said compensated voltage signal and a periodic signal at a comparator to provide a PWM signal to said DC to DC converter in response to a comparison of said compensated voltage signal with said periodic signal.

16. The method of claim 15, wherein said error signal comprises a term representative of said desired output voltage and wherein said altering operation comprises canceling out said term.

17. The method of claim 16, wherein a feedback impedance is coupled between an inverting input terminal of an error amplifier and an output terminal of said error amplifier, said error amplifier providing said error signal, and wherein and input impedance is coupled to said inverting input terminal of said error amplifier, wherein said compensated voltage signal is given by the equation:

$$Vc = Zf/Zin(Vp - Vout);$$

where Vc is said compensated voltage signal, Zf is said feedback impedance, Zin is said input impedance, Vp is said reference signal, and Vout is said actual output voltage.

18. The method of claim 15, wherein said compensating operation comprises changing a bias voltage of a ramp signal provided to said comparator in response to said change in said reference signal, said comparator receiving said error signal and said ramp signal and providing a PWM signal to said DC to DC converter in response to a comparison of said error signal with said ramp signal.

19. The method of claim 18, wherein said changing of said bias voltage is directly proportional to said change in said reference signal so said bias voltage is equal to a voltage value of said reference signal plus an initial bias voltage level of said ramp signal.

20. The method of claim 15, wherein said compensating operation comprises changing a slew rate of a ramp signal provided to said comparator in response to an input voltage level of said DC to DC converter, said comparator receiving said error signal and said ramp signal and providing a PWM signal to said DC to DC converter in response to a comparison of said error signal with said ramp signal.

21. The method of claim 20, further comprising adjusting a gain of a PWM modulator with reference voltage compensation circuitry to drive said overshoot to zero by satisfying the equation:

$$\frac{dV_P}{dt} = \frac{dV_{COMP}(t)}{dt} = \frac{dV_{OUT}}{dt};$$

where $dV_P/dt$ is a slew rate of said change is said reference signal, $dVcomp(t)/dt$ is a slew rate of said error signal, and $dVout/dt$ is a slew rate of said output voltage of said DC to DC converter.

* * * * *